US009310971B2

(12) United States Patent
Hashimoto et al.

(10) Patent No.: US 9,310,971 B2
(45) Date of Patent: Apr. 12, 2016

(54) DOCUMENT VIEWING DEVICE FOR DISPLAY DOCUMENT DATA

(75) Inventors: Masaya Hashimoto, Itami (JP); Yoshio Komaki, Nishinomiya (JP); Tomonari Yoshimura, Kyoto (JP); Takeshi Hibino, Toyokawa (JP); Atsushi Tamura, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 286 days.

(21) Appl. No.: 13/306,604

(22) Filed: Nov. 29, 2011

(65) Prior Publication Data
US 2012/0137219 A1 May 31, 2012

(30) Foreign Application Priority Data

Nov. 30, 2010 (JP) ................................. 2010-266514

(51) Int. Cl.
*G06F 17/00* (2006.01)
*G06F 3/0483* (2013.01)
(52) U.S. Cl.
CPC .................................... *G06F 3/0483* (2013.01)
(58) Field of Classification Search
CPC .................................................. G06F 3/0483
USPC ......................................................... 715/273
See application file for complete search history.

(56) References Cited

U.S. PATENT DOCUMENTS

| 7,081,882 | B2 | 7/2006 | Sowden et al. | |
|---|---|---|---|---|
| 2001/0049700 | A1* | 12/2001 | Ichikura | ........................ 707/512 |
| 2004/0168121 | A1* | 8/2004 | Matz | .............................. 715/513 |
| 2007/0171482 | A1* | 7/2007 | Iwasaki | .......................... 358/452 |
| 2011/0213655 | A1* | 9/2011 | Henkin et al. | .............. 705/14.49 |
| 2012/0036431 | A1* | 2/2012 | Ito et al. | ......................... 715/273 |

FOREIGN PATENT DOCUMENTS

| JP | 2000-172704 | 6/2000 |
|---|---|---|
| JP | 2000-357121 | 12/2000 |
| JP | 2001-109769 | 4/2001 |
| JP | 2003-122619 | 4/2003 |

(Continued)

OTHER PUBLICATIONS

Japanese Decision to Grant Patent mailed Jan. 8, 2013, directed to Japanese application 2010-266514, w/English translation, 6 pgs.

(Continued)

*Primary Examiner* — Laurie Ries
*Assistant Examiner* — Zaida I Marrero
(74) *Attorney, Agent, or Firm* — Osha Liang LLP

(57) ABSTRACT

A MFP is a document viewing device for displaying document data divided for each page. The document viewing device includes a processing device which performs a process of generating a viewing history of a document by a user based on a user operation performed for the document currently displayed on a display device; a process evaluating relevance to an object displayed on the display device to extract the page relevant to the object displayed on the display device from the document data; a process of determining based on the viewing history whether the object is checked or unchecked by the user to extract, from the extracted pages, a page for which it is determined that the object is unchecked; and a process of causing the display device to display, together with the displayed object, a shortcut linked to the page for which it is determined that the object is unchecked.

21 Claims, 9 Drawing Sheets

(56) References Cited

FOREIGN PATENT DOCUMENTS

| | | |
|---|---|---|
| JP | 2003-140802 | 5/2003 |
| JP | 2004-234284 | 8/2004 |
| JP | 2009-26249 | 2/2009 |
| JP | 2012-14488 | 1/2012 |

OTHER PUBLICATIONS

Ikeda, F. (Feb. 2010). "Data Linkage: Advantageous Style," *MacPeople* 16(4): 150-151, with partial English translation.

Notice of Grounds of Rejection mailed Oct. 9, 2012, directed to Japanese Application No. 2010-266514; 5 pages.

\* cited by examiner

| INFORMATION NUMBER | PAGE NUMBER | VIEWING START TIME | VIEWING END TIME |
|---|---|---|---|
| 1 | PAGE 1 | 2010/1/1/ 09:00:00 | 2010/1/1/ 09:01:00 |
| 2 | PAGE 2 | 2010/1/1/ 09:01:00 | 2010/1/1/ 09:01:30 |
| 3 | PAGE 1 | 2010/1/1/ 09:01:30 | 2010/1/1/ 09:02:00 |
| 4 | PAGE 2 | 2010/1/1/ 09:02:00 | 2010/1/1/ 09:03:00 |
| 5 | PAGE 3 | 2010/1/1/ 09:03:00 | 2010/1/1/ 09:04:00 |
| 6 | PAGE 4 | 2010/1/1/ 09:04:00 | 2010/1/1/ 09:05:00 |
| ⋮ | ⋮ | ⋮ | ⋮ |
| n | PAGE n | 2010/1/1/ xx:xx:xx | 2010/1/1/ xx:xx:xx |

| SHORTCUT ID | DISPLAY POSITION OF SHORTCUT | NUMBER OF PAGE TO BE JUMPED |
|---|---|---|
| 1 | (100, 10) | PAGE 4 |
| 2 | (100, 20) | PAGE 7 |
| ⋮ | ⋮ | ⋮ |
| n | (100, m) | PAGE x |

| INFORMATION NUMBER | PAGE NUMBER | CHECK REQUIRING PORTION |
|---|---|---|
| 1 | PAGE 1 | FOURTH LINE |
| 2 | PAGE 2 | OBJECT ID xxxx |
| 3 | PAGE 4 | TENTH LINE |
| ⋮ | ⋮ | ⋮ |
| n | PAGE x | ⋮ |

FIG.11

| INFORMATION NUMBER | PAGE NUMBER | TOUCH-PANEL DETECTION COORDINATES |
|---|---|---|
| 1 | PAGE 1 | (10, 10) |
| 2 | PAGE 1 | (10, 50), (11, 50), (12, 50), ､ ､ ､(20, 50) |
| 3 | PAGE 3 | (90, 90) |
| ⋮ | ⋮ | ⋮ |
| n | PAGE x | ⋮ |

FIG.12

| INFORMATION NUMBER | PAGE NUMBER | READ-OUT PORTION |
|---|---|---|
| 1 | PAGE 1 | THIRD LINE, FIFTH CHARACTER "qwert" |
| 2 | PAGE 3 | TENTH LINE, FIRST CHARACTER "gfdsa" |
| ⋮ | ⋮ | ⋮ |
| n | PAGE x | ⋮ |

FIG.13

| INFORMATION NUMBER | CHECK REQUIRING INFORMATION INFORMATION NUMBER | CHECK DETERMINATION |
|---|---|---|
| 1 | No. 5 | CHECKED |
| 2 | No. 7 | UNCHECKED |
| ⋮ | ⋮ | ⋮ |
| n | No. x | UNCHECKED |

FIG.14

| SHORTCUT ID | DISPLAY POSITION OF SHORTCUT | NUMBER OF PAGE TO BE JUMPED | CHECK DETERMINATION |
|---|---|---|---|
| 1 | (100, 10) | PAGE 4 | CHECKED |
| 2 | (100, 20) | PAGE 7 | UNCHECKED |
| ･･ | ･･ | ･･ | ･･ |
| n | (100, m) | PAGE x | UNCHECKED | a process of evaluating relevance to an object displayed on the display device to extract a page relevant to the object displayed on the display device from the document data, a process of determining based on the viewing history whether the

DOCUMENT VIEWING DEVICE FOR DISPLAY DOCUMENT DATA

This application is based on Japanese Patent Applications No. 2010-266514 filed with the Japan Patent Office on Nov. 30, 2010, the entire content of which is hereby incorporated by reference.

BACKGROUND OF THE INVENTION

1. Field of the Invention

The present invention relates to a document viewing device and a display method in the document viewing device, and particularly to a document viewing device for displaying a document such that the document can be viewed, and a display method in the document viewing device.

2. Description of the Related Art

When a viewer views a document printed on paper, the viewer checks the document while placing marks (an underline, a marker, and the like) on the checked portion. This makes it clear which part is already checked or still unchecked when the viewer checks the document again later. Consequently, the part to be checked can be readily distinguished.

Thus, there are many proposals of document viewing software for displaying a document on a computer to implement the situation in which the document shown on the computer can be viewed in a similar manner to the case where the document printed on the paper is viewed. For example, Japanese Laid-Open Patent Publication No. 2003-140802 and Japanese Laid-Open Patent Publication No. 2000-172704 each disclose the technique for, when the above-mentioned document viewing software is used to display a document, displaying a page relevant to the currently displayed page by a prescribed operation and for setting a mark referred to as a bookmark and the like and performing a certain operation for the bookmark to display the relevant page.

According to the technique disclosed in each of these literatures, however, the users themselves should set the relevant page and bookmarks in advance. Furthermore, it should be determined whether the relevant page is already checked or still unchecked, as occasion requires, by the users themselves seeing the page. This causes a problem that the entire document cannot be efficiently viewed.

SUMMARY OF THE INVENTION

The present invention has been made in light of the above-described problems, and an object of the present invention is to provide a document viewing device that allows the entire document to be efficiently viewed, and a display method in the document viewing device.

In order to accomplish the above-described object, according to an aspect of the present invention, a document viewing device for displaying document data divided for each page is provided. The document viewing device includes a storage device for storing the document data; a display device; a processing device for performing a process of causing the display device to display a document based on the document data; and an input device for accepting a user operation. The processing device performs a process of generating a viewing history of the document by a user based on the user operation performed for the document displayed on the display device, a process of evaluating relevance to an object displayed on the display device to extract a page relevant to the object displayed on the display device from the document data, a process of determining based on the viewing history whether the object is checked or unchecked by the user to extract, from pages that are extracted, a page for which it is determined that the object is unchecked, and a process of causing the display device to display, together with the displayed object, a shortcut linked to the page for which it is determined that the object is unchecked.

Preferably, based on the user operation to select the shortcut, the processing device further updates display of the display device to a page to which the shortcut is linked.

Preferably, in the process of extracting a relevant page, the processing device extracts, as the relevant page, a page of the document other than the page displayed on the display device. This page of the document includes the object identical to the object included in the page displayed on the display device.

Preferably, in the process of extracting the relevant page, the processing device extracts, as the relevant page, a page of the document other than the page displayed on the display device. This page of the document is linked to the page displayed on the display device.

Preferably, in the process of generating the viewing history, the processing device records display time as the viewing history for each page displayed on the display device. In the process of extracting the page for which it is determined that the object is unchecked, the processing device compares the display time with reference time stored in advance for each page of the document, to determine for each page whether the object is checked or unchecked by the user.

Preferably, the input device receives designation specifying a position of the document displayed on the display device. In the process of generating the viewing history, the processing device records, as the viewing history, information specifying the position on the page displayed on the display device, the position being designated in the input device.

Preferably, the input device receives an audio input, and the processing device records, as the viewing history, information specifying the object that corresponds to the input audio and is included in the page displayed on the display device when the audio input is received.

More preferably, the document data includes information specifying a prescribed object of the document data. In the process of extracting the page for which it is determined that the object is unchecked, the processing device determines whether each prescribed object is checked or unchecked by the user, based on at least one of the viewing history based on the designation specifying the position of the document received by the input device and the viewing history based on the audio input received by the input device.

Preferably, in the process of extracting the page for which it is determined that the object is unchecked, the processing device extracts the page including the prescribed object determined as being unchecked from pages each extracted as being relevant to the object displayed on the display device.

Preferably, in the process of generating the viewing history, the processing device records display time as the viewing history for each page displayed on the display device. In the process of extracting the page for which it is determined that the object is unchecked, the processing device compares the display time with reference time stored in advance for each page of the document, to determine for each page whether the object is checked or unchecked by the user, and extract the page that includes the prescribed object determined as being unchecked and is determined as being unchecked by the user from pages each extracted as being relevant to the object displayed on the display device.

Preferably, in the process of generating the viewing history, the processing device records display time as the viewing history for each page displayed on the display device. In the process of extracting the page for which it is determined that the object is unchecked, the processing device compares the display time with reference time stored in advance for each page of the document, to determine for each page whether the object is checked or unchecked by the user, and extract the page including the prescribed object determined as being unchecked from pages each extracted as being relevant to the object displayed on the display device. In the process of displaying the shortcut, the processing device causes the display device to display the shortcut distinctively based on a determination result as to whether the object is checked or unchecked by the user.

According to another aspect of the present invention, a display method in a document viewing device is a method of displaying document data divided for each page in a document viewing device. The document viewing device includes an input device for accepting a user operation. The method includes the steps of: generating a viewing history of a document by a user based on the user operation performed for a page displayed on the display device; evaluating relevance to an object displayed on the display device to extract a page relevant to the object displayed on the display device from pages of the document data; determining based on the viewing history whether the object is checked or unchecked by the user to extract, from pages that are extracted, a page for which it is determined that the object is unchecked; and causing the display device to display, together with the displayed object, a shortcut linked to the page for which it is determined that the object is unchecked.

Preferably, the step of generating the viewing history includes the step of recording display time as the viewing history for each page displayed on the display device. The step of extracting the page for which it is determined that the object is unchecked includes the step of comparing the display time with reference time stored in advance for each page of the document, to determine for each page whether the object is checked or unchecked by the user.

Preferably, the document data includes information specifying a prescribed object of the document data. The step of generating the viewing history includes the step of recording, as the viewing history, information specifying a position of the document data designated by the user operation based on the user operation performed for the page displayed on the display device. The step of extracting the page for which it is determined that the object is unchecked includes the step of determining based on the viewing history whether each prescribed object is checked or unchecked by the user, to extract the page including the prescribed object determined as being unchecked from pages each extracted as being relevant to the object displayed on the display device.

According to still another aspect of the present invention, a non-transitory recording medium is a non-transitory computer-readable recording medium recording a display program for causing a document viewing device to perform a process of displaying document data divided for each page. The document viewing device includes an input device for accepting a user operation. The program causes the document viewing device to perform the steps of: generating a viewing history of a document by a user based on the user operation performed for a page displayed on a display device; evaluating relevance to an object displayed on the display device to extract a page relevant to the object displayed on the display device from pages of the document data; determining based on the viewing history whether the object is checked or unchecked by the user to extract, from pages that are extracted, a page for which it is determined that the object is unchecked; and causing the display device to display, together with the displayed object, a shortcut linked to the page for which it is determined that the object is unchecked.

Preferably, the step of generating the viewing history includes the step of recording display time as the viewing history for each page displayed on the display device. The step of extracting the page for which it is determined that the object is unchecked includes the step of comparing the display time with reference time stored in advance for each page of the document to determine for each page whether the object is checked or unchecked by the user.

Preferably, the document data includes information specifying a prescribed object of the document data. The step of generating the viewing history includes the step of recording information specifying a position of the document data designated by the user operation as the viewing history based on the user operation performed for the page displayed on the display device. The step of extracting the page for which it is determined that the object is unchecked includes the step of determining based on the viewing history whether each prescribed object is checked or unchecked by the user, to extract a page including the prescribed object determined as being unchecked from pages each extracted as being relevant to the object displayed on the display device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 11 and 12 each are a diagram showing a specific example of the viewing history.

FIG. 13 is a diagram showing a specific example of check result information.

FIG. 14 is a diagram showing a specific example of shortcut information.

DESCRIPTION OF THE PREFERRED EMBODIMENTS

Figure 1:
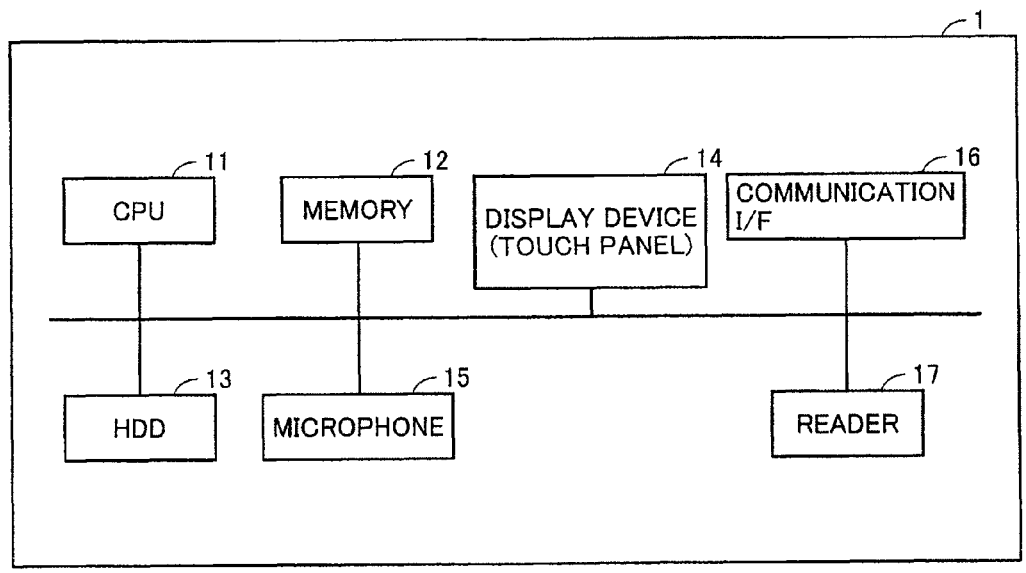
FIG. 1 is a diagram showing a specific example of the configuration of a MFP (Multi-Functional Peripheral) provided with a document viewing device according to the present embodiment.

The embodiments of the present invention will be hereinafter described with reference to the accompanying drawings, in which the same parts and components are designated by the same reference characters. Names and functions thereof are also the same.

The document viewing device according to the present embodiment may be implemented by a personal computer and the like, or may be provided in an image processing apparatus such as a MFP (Multi-Functional Peripheral) and a portable communication terminal referred to as a smartphone and the like. The device to be implemented or to be provided is not limited to a specific device.

The following is an explanation of an example in which a document viewing device is mounted in a MFP serving as an image processing apparatus and a part of the functions of the MFP serves as a document viewing device.

<Device Configuration>

FIG. 1 is a diagram showing a specific example of the configuration of a MFP 1 provided with a document viewing device according to the present embodiment.

Referring to FIG. 1, as a hardware configuration, MFP 1 includes a CPU (Central Processing Unit) 11 for controlling the entire device, memory 12 for storing the program and the like executed by CPU 11, an HDD (Hard Disk Drive) 13 for storing a document as electronic data, a display device 14, a microphone 15, a communication interface (I/F) 16 electrically connecting to another device for exchanging data therewith, and a reader 17 corresponding to a scanner and the like which optically reads a document.

Figure 2:
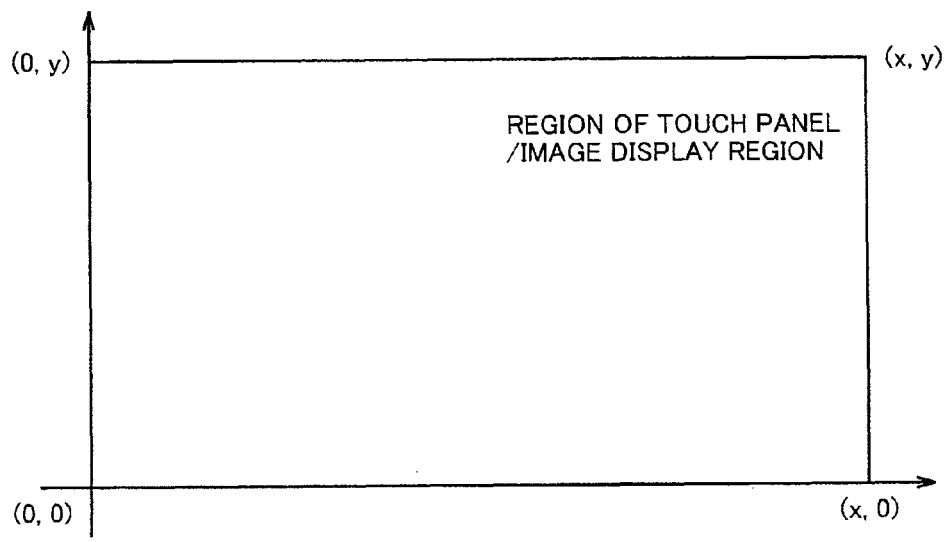
FIG. 2 is a diagram illustrating a coordinate system set in a display device serving as a touch panel of the MFP.

In the present example, display device 14 is configured as a touch panel. Accordingly, display device 14 is not only capable of displaying a document but also functions as an input device for receiving an input for designation. On the display screen of display device 14 serving as a touch panel, a coordinate system is set, for example, as shown in FIG. 2 in order to specify the designated position. When accepting a touch operation on the display screen, display device 14 serving as a touch panel outputs, to CPU 11, a signal represented on the coordinates specifying the designated position.

First Embodiment

Summary of Operation

MFP 1 causes a document to be displayed on display device 14 based on the document data divided into pages. The document data divided into pages, for example, corresponds to PDF (Portable Document Format) data and also represents the document data paginated in advance. Such document data may be created by the user using prescribed software and stored in HDD 13, or may be created by reader 17 of MFP 1 reading the sheets of paper one by one and then stored in HDD 13.

In the first embodiment, when a page of the document is displayed on display device 14, MFP 1 displays, on the displayed page of the document, a shortcut to the page that is relevant to the displayed object and determined as being unchecked. Then, when this shortcut is selected, the display image is jumped to the corresponding page.

In this case, the object means a character, a character string and a pictogram included in the document data, a graphic chart such as a graph and a table, an image, or an entire page including a plurality of characters or character strings.

In order to implement the display as described above, MFP 1 according to the first embodiment performs a process of evaluating relevance to the object displayed for each page of the document to determine whether there is any relevance to the displayed object; a process of determining for each page of the document whether checking has been performed or not; and a process of displaying a shortcut to the page that is relevant but determined as being unchecked.

Among the above-described processes, a detailed explanation will be made with regard to the process of determining whether checking has been performed or not and the process of extracting a relevant page. The summary of each of these processes is the same as that in the second embodiment.

<Summary of Process of Determining Whether Checking has been Performed or not>

As an example of the process of determining whether checking has been performed or not, MFP 1 controls the display time for each page. Then, when there is a page for which the controlled time is longer than the reference time stored in advance, it is determined that this page has been checked. When the controlled time is shorter than the reference time, it is determined that this page is unchecked.

<Summary of Process of Extracting Relevant Page>

The document to be processed is assumed to be a document created by the application that is capable of setting a title, a headline, items and the like in the page as a format of the document when creating the document. Even in the case of the document created by the application other than the above-described application, similar determination can be made using objects (a character or a character string) included in any of the pages, without limitation to a title, a headline and an item in the page as described below.

The method of evaluating relevance to the currently displayed object may include evaluation methods (1) to (3) described below.

(1) All of the pages are searched for an object in the title, the headline and the items in the currently displayed page, and when this object is included in another page, it is determined that this another page is relevant to the currently displayed object.

(2) When the currently displayed page includes the object in the title, the headline and the items in any one of the pages of the document that is different from the currently displayed page, it is determined that the page including this object is relevant to the currently displayed object.

(3) When the currently displayed page is linked to another page, or when the page different from the currently displayed page is linked to the currently displayed page, it is determined that this different page is relevant to the object (page) that is currently displayed.

<Function Configuration>

Figures 3, 4:
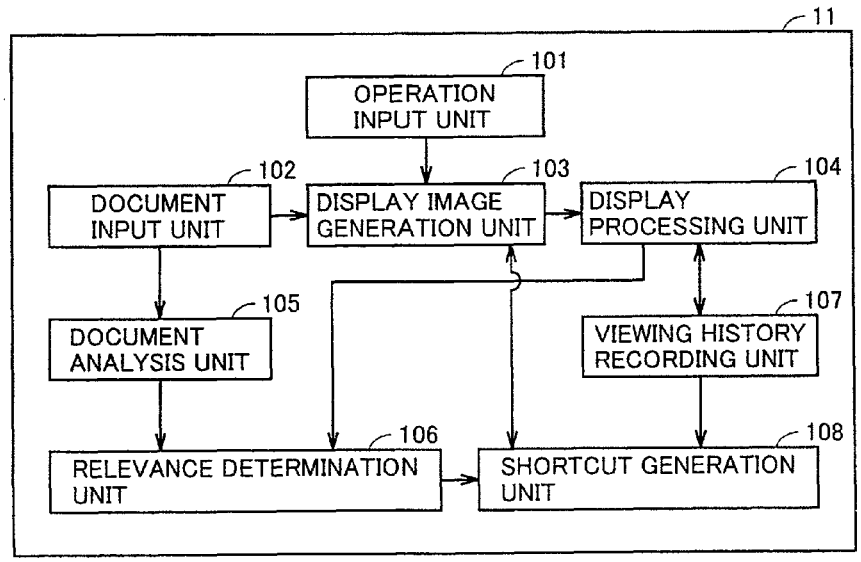
FIG. 3 is a block diagram showing the function configuration of the MFP according to the first embodiment.
FIG. 4 is a diagram showing a specific example of a viewing history.

FIG. 3 is a block diagram showing the function configuration of MFP 1 for performing the operation explained in the above-described summary of the operation in MFP 1 according to the first embodiment. Each function shown in FIG. 3 is implemented mainly by CPU 11 reading and executing the program stored in memory 12, but may be implemented by the hardware configuration that is at least partially shown in FIG. 1.

Referring to FIG. 3, MFP 1 according to the first embodiment includes an operation input unit 101 for receiving an input of an operation signal based on the user operation from display device 14 serving as a touch panel; a document input unit 102 for receiving an input of the document as electronic data from reader 17 or another device; a display image generation unit 103 for generating image data for the display image of the document on display device 14; a display processing unit 104 for performing the process of causing the display screen to be displayed on display device 14; a document analysis unit 105 for analyzing the input document; a relevance determination unit 106 for determining whether each page of the document is relevant to the page to be displayed; a viewing history recording unit 107 for generating a viewing history for each page of the document based on the time displayed on display device 14 and storing the viewing history in a prescribed region of memory 12; and a shortcut generation unit 108 for generating a shortcut to the required page based on the viewing history and the determination result obtained in relevance determination unit 106.

Viewing history recording unit 107 records the display time as a viewing history for each page of the document currently displayed on display device 14. FIG. 4 is a diagram showing a specific example of the viewing history. Referring to FIG. 4, as for the viewing history, the time at which at least the page is started to be displayed on display device 14 is recorded as "viewing start time" for each page of the document. Preferably, as shown in FIG. 4, the time at which the display of the page is ended is further recorded as "viewing end time". The display time of this page is obtained by calculating the difference between the "viewing start time" and the "viewing end time". In the case where only the viewing start time is recorded as a viewing history, the difference between this viewing start time and the viewing start time of the next page is calculated, to obtain the display time of the page in the case where it is assumed that the pages of the document are displayed in numerical order according to page number.

Furthermore, viewing history recording unit 107 may store the viewing history associated with the document data for each document data. In this way, when the previously displayed document data is displayed, the viewing history generated during the previous display is used to perform the process described below, to thereby allow a shortcut to be displayed.

Shortcut generation unit 108 stores the reference time in advance that is used for determining for each page whether checking has been performed or not, and compares the display time obtained for each page as described above with the reference time, to determine for each page whether checking has been performed or not. In other words, when the display time of one page is shorter than the reference time, this one page is determined as being "unchecked", and when the display time is longer than the reference time, this one page is determined as having been "checked".

Document analysis unit 105 performs an analyzing process for each page of the input document, and inputs character strings included in this page into relevance determination unit 106. In the case where the document to be processed is a document created by the application that is capable of setting a title, a headline and items in the page as a format of the document when the document is created, document analysis unit 105 analyzes the title, the headline and the itemized region for each page to extract the character strings included in each page. In the case of the document created by the application different from the above-described application, document analysis unit 105 performs the analyzing process for each page to extract the character strings included in each page.

Furthermore, document analysis unit 105 analyzes for each page whether the shortcut is set or not and to which the shortcut is linked.

Based on the analysis results regarding the object or the shortcut for each page extracted in document analysis unit 105, relevance determination unit 106 determines for each page of the document whether there is relevance to the currently displayed object.

Specifically, when the relevance is evaluated by the above-described evaluation method 1, relevance determination unit 106 determines whether the object in the title, the headline and the items on the currently displayed page is included in other pages, and determines that the page including this object is relevant to the currently displayed object.

When the relevance is evaluated by the above-described evaluation method 2, relevance determination unit 106 determines whether the object in the title, the headline and the items on any of the pages other than the currently displayed page is included in the currently displayed page. When this object is included in the currently displayed page, relevance determination unit 106 determines that these other pages each including this object is relevant to the currently displayed object.

When the relevance is evaluated by the above-described evaluation method 3, relevance determination unit 106 determines that another page to which the shortcut set in the currently displayed page is linked or another page in which a shortcut linked to the currently displayed page is set is relevant to the currently displayed page.

Relevance determination unit 106 may make a determination using one of the above-described evaluation methods 1 to 3 or using two or more methods of the above-described evaluation methods 1 to 3.

Shortcut generation unit 108 generates shortcut information used for displaying, on the currently displayed page, a shortcut linked to the page determined by relevance determination unit 106 as being relevant to the currently displayed object and also determined as being unchecked in the viewing history. Shortcut generation unit 108 then outputs the shortcut information to display image generation unit 103.

Figures 5, 6:
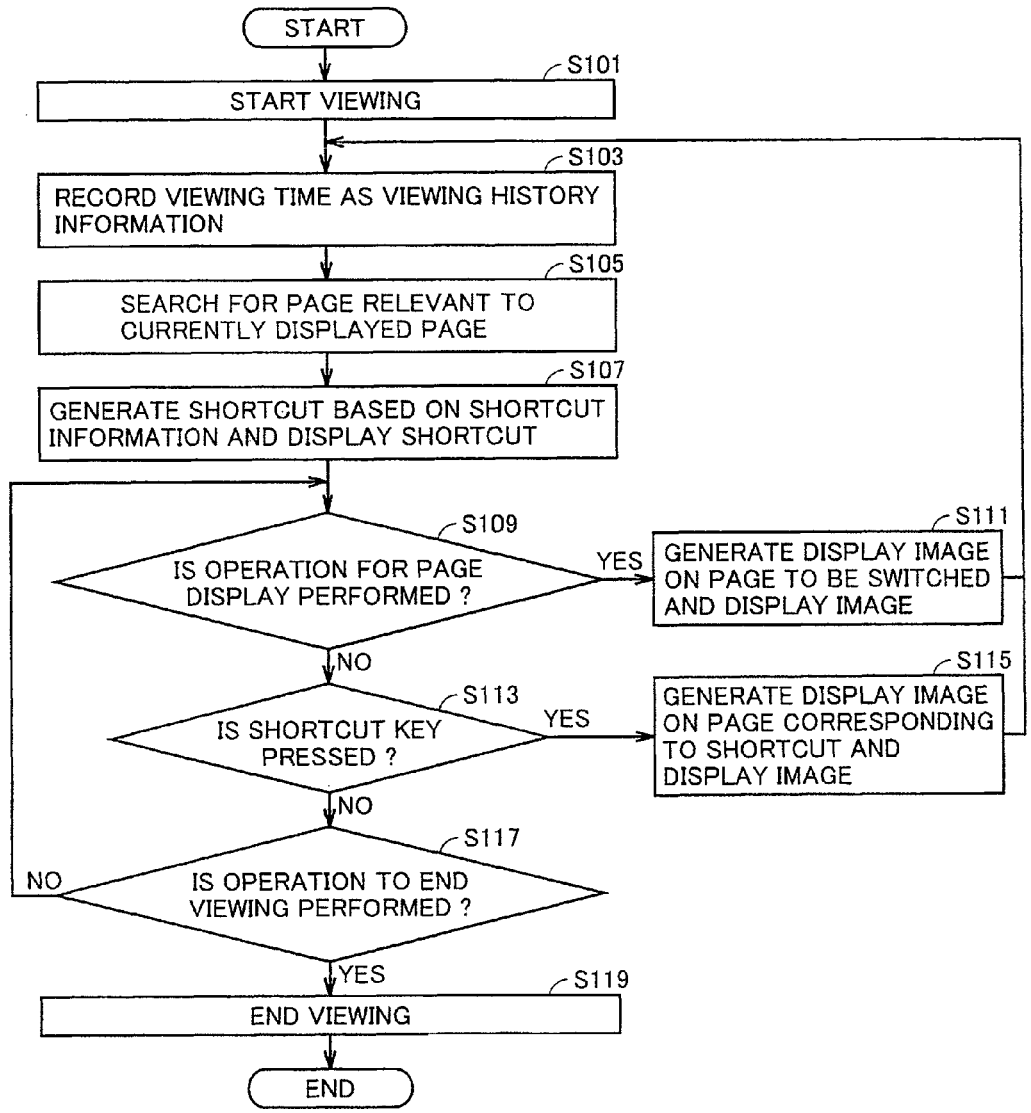
FIG. 5 is a diagram showing a specific example of shortcut information.
FIG. 6 is a flow chart showing a specific example of the operation in the MFP according to the first embodiment.

FIG. 5 is a diagram showing a specific example of the shortcut information. Referring to FIG. 5, the shortcut information is used for defining, for each shortcut, the information specifying the corresponding shortcut (shortcut ID), a display position of the shortcut, and the information specifying the page to which the shortcut is linked (the number of the page to be jumped).

The shortcut ID may be automatically assigned each time the shortcut information is generated in shortcut generation unit 108.

The information specifying the page to be linked is set based on the determination results obtained in relevance determination unit 106.

The display position of the shortcut may be defined in advance. More preferably, the display position of the shortcut is determined in accordance with the layout of the currently displayed page in order to prevent degradation in the visibility of the currently displayed page. By way of example, shortcut generation unit 108 may specify the margin position set with respect to the document based on the format information of the document represented by the electronic data, to set this position as a display position of the shortcut. In this case, more preferably, the priority order to arrange the right edge, the lower edge, the upper edge, the left edge and the like in the margin region is stored for setting the display position of the shortcut in accordance with this priority order.

By way of another example, based on the image data for the display image generated in display image generation unit 103, the position at which the object included in the document is not disposed may be specified to set this position as a display position of the shortcut. By way of still another example, also when no margin is set, the display position of the shortcut may be set in accordance with the above-described priority order.

By way of still another example, when the relevance is evaluated by the above-described evaluation method 1, the display position of the shortcut may be set that corresponds to the vicinity of the object which is determined as being relevant to another page and is included in the currently displayed page.

Display image generation unit 103 updates the image data such that the shortcut based on the shortcut information generated in shortcut generation unit 108 is displayed overlaid on the currently displayed page. Then, display image generation unit 103 outputs this image data to display processing unit 104. Consequently, the shortcut linked to the page relevant to the currently displayed page is displayed overlaid on this currently displayed page.

When receiving the operation signal designating the position touched through display device 14 serving as a touch panel while this page is being displayed, display image generation unit 103 specifies the shortcut selected based on the shortcut information and the linked page set for this shortcut. Then, display image generation unit 103 generates the image data for displaying the linked page and outputs the image data to display processing unit 104. Thus, the shortcut is selected to cause the displayed page to be jumped to the linked page.

<Operation Flow>

FIG. 6 is a flow chart showing a specific example of the operation in MFP 1 according to the first embodiment. The operation shown in the flow chart in FIG. 6 is implemented by CPU 11 reading and executing the program stored in memory 12 and causing each function shown in FIG. 3 to be performed.

Referring to FIG. 6, in step S101, CPU 11 receives designation of the document and causes display device 14 to start to display the document. When particularly no page is designated, the first page is displayed. When a page is designated, the designated page is displayed. Then, the user starts to view the document.

In step S103, CPU 11 registers, for each page, a viewing history in which at least the display start time is set as a viewing start time. Furthermore, in step S105, CPU 11 employs at least one of the above-described evaluation methods 1 to 3 to search for the page relevant to the currently displayed page. Then, CPU 11 generates shortcut information linked to the relevant page that is determined as being unchecked based on the viewing history. In step S107, CPU 11 generates an icon image for a shortcut based on the shortcut information, and causes the icon image to be displayed overlaid on this page.

Figure 7:
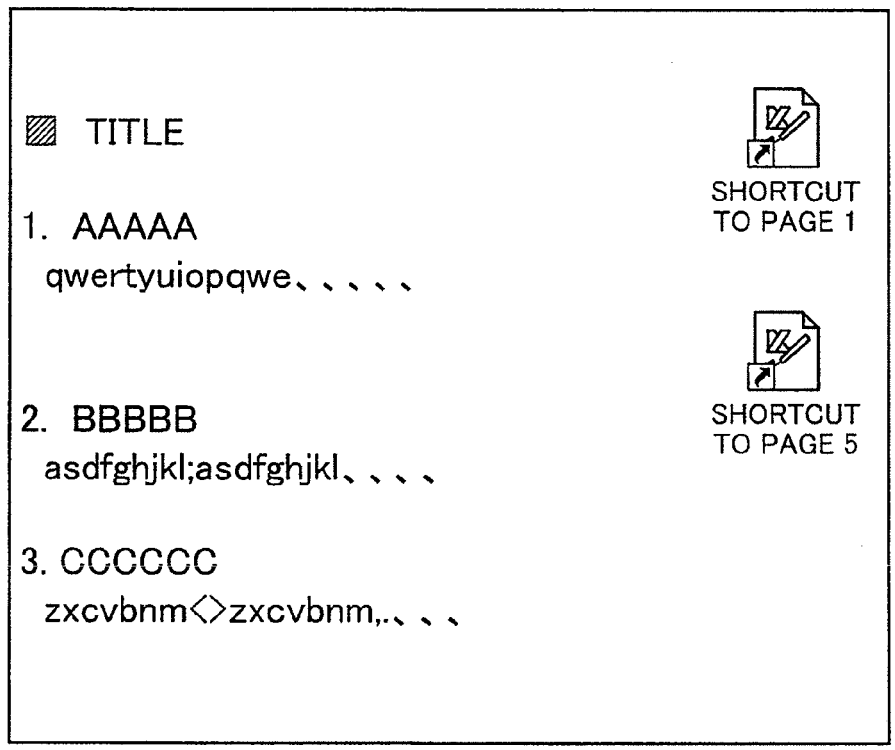
FIG. 7 is a diagram showing a specific example of a screen displayed in step S107 in FIG. 6.

FIG. 7 is a diagram showing a specific example of the screen displayed in step S107 as described above. In the above-described step S107, as shown in FIG. 7, a shortcut is displayed overlaid on the display image in the above-described step S101. As described above; the display position of the shortcut is preferably set in the margin region that is set with respect to the document and the region in which the object included in the document is not disposed. Accordingly, as shown in FIG. 7, the shortcut is displayed not overlaid on the object such as a character in the document, so that the visibility of the document may not be impaired.

In this state, that is, in the state where the shortcut linked to a page relevant to one designated page of the document is displayed overlaid on this one designated page of the document, when the operation is performed such that the operation signal indicating the user operation is received from display device 14 serving as a touch panel and this operation is for changing the page to be displayed (YES in step S109), CPU 11 generates image data for displaying the designated page on display device 14 and causes the image data to be displayed, in step S111. Consequently, the display of display device 14 is updated.

Alternatively, in the case where the above-described operation is for pressing the displayed shortcut (YES in step S113), in step S115, CPU 11 refers to the shortcut information to specify the page associated with this shortcut, and switches the displayed page to the linked page to cause the linked page to be displayed. Consequently, the display of display device 14 is updated.

CPU 11 monitors the input of the operation signal until the operation signal indicating the operation to end viewing is input, and executes the process in the above-described step S111 or step S115 in accordance with the input operation signal. Then, when the operation signal indicating the operation to end viewing is input (YES in step S117), CPU 11 causes the display of the document to be ended in step S119, to complete a series of operations.

<Effect of First Embodiment>

When the above-described operation is performed in MFP 1, each page is automatically set as being checked/unchecked in accordance with the viewing time without the user having to set each page as being checked/unchecked. Then, the shortcut linked to the unchecked page among the pages relevant to the currently displayed page is automatically displayed overlaid on the currently displayed page. Consequently, the user can efficiently view this document without having to perform any special operation.

Furthermore, as described above, the viewing history is stored associated with the document data, which allows a shortcut to be displayed also with reference to the viewing history obtained at the time of previous viewing even when the previously viewed document is viewed again. Therefore, efficient viewing of the document can be achieved.

Second Embodiment

Summary of Operation

In the second embodiment, the object that should be checked in advance (hereinafter also referred to as a check requiring portion) is set in the document to be displayed in MFP 1. Such a document is created using a document creation application. Also, the check requiring portion can be set by the creator of this document using this document creation application at the time of creation of the document and making designation in units of objects such as characters and images or in units of lines regarded as object groups.

Figure 8:
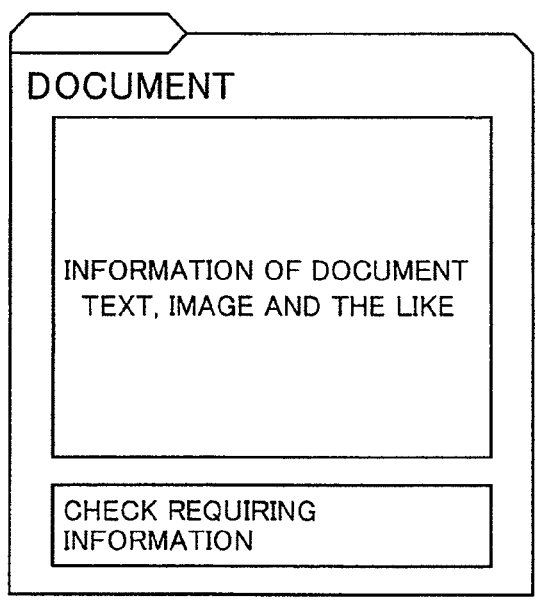
FIG. 8 is a diagram showing a specific example of the configuration of electronic data of the document in which the check requiring portion is set.

FIG. 8 is a diagram showing a specific example of the configuration of electronic data of the document in which the check requiring portion is set. Referring to FIG. 8, the information indicating the check requiring portion (which will be hereinafter also referred to as check requiring information) is associated with the information indicating the body of the document, thereby forming electronic data of this document.

Figures 9, 10:
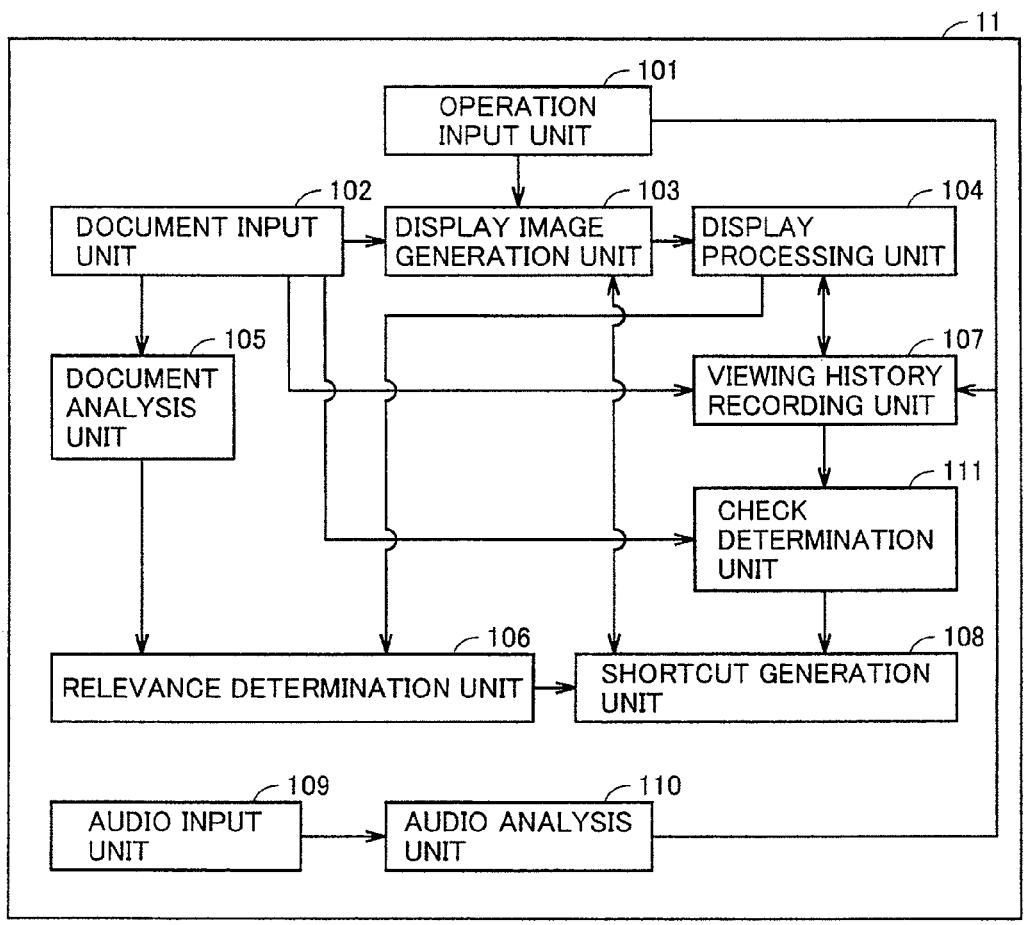
FIG. 9 is a diagram showing a specific example of the check requiring information.
FIG. 10 is a block diagram showing the function configuration of the MFP according to the second embodiment.

FIG. 9 is a diagram showing a specific example of the check requiring information. Referring to FIG. 9, the check requiring information includes, for each check requiring portion, the information specifying this check requiring information (information number), the information specifying the page of the document in which the check requiring portion is set (page number), and the information specifying the position of the check requiring portion in this page (portion required to be checked).

The check requiring portion is set by the creator of the document as a portion that particularly needs to be checked by other users. Accordingly, during display of the document, the check requiring portion is preferably displayed in a distinctive manner so as to be shown in size and color different from those of other objects. For that purpose, the check requiring information may further include the information specifying the display manner for each check requiring portion.

Furthermore, it is also conceivable that the creator of the document may check whether or not another user has checked the check requiring portion. For this purpose, it is preferable that the document data may include the information indicating whether the check requiring portion has been checked or not, and the check result may be output by a prescribed operation. Alternatively, this result may be transmitted to the creator. For this purpose, the check requiring information may further include the information (for example, a flag), for each check requiring portion, indicating whether the check requiring portion has been checked or not. As described below, it is determined in the document viewing device whether the check requiring portion has been checked or not. Based on this result, this information is updated. The result of checking the check requiring portion may be included in the document data and may be displayed by a prescribed operation on display device 14 of MFP 1 together with this document or separately from this document, or may be printed by the printer function (not shown) in MFP 1. Furthermore, the check requiring information may include a specific address, to which the result of checking the check requiring portion may be transmitted from communication I/F 16 of MFP 1.

In the second embodiment, when one page of the document is displayed on display device 14, MFP 1 displays, on the displayed page of the document, a shortcut to the page that is relevant to this one displayed page and determined as including an unchecked check requiring portion. Then, when this shortcut is selected, the display image is to be jumped to the corresponding page.

In order to implement the above-described display, MFP 1 according to the second embodiment performs the process of determining for each set check requiring portion whether checking has been performed or not, the process of determining for each page of the document whether there is any relevance to the displayed page, and the process of displaying a shortcut for the page that is relevant and includes a check requiring portion determined as being unchecked.

The process of extracting a relevant page among the above-described processes is the same as that described in the first embodiment.

A detailed explanation will be made particularly with regard to the process of determining whether each check requiring portion has been checked or not.

<Summary of Process of Determining Whether Check Requiring Portion is Checked or Unchecked>

As an example of this process, based on the operation by the user performed for the displayed page for specifying the viewed object (hereinafter referred to as a viewed portion), MFP 1 specifies the viewed portion and stores the information indicating this portion as viewing history information. Then, MFP 1 compares the check requiring portion set in the document with the viewed portion represented by the viewing history information, to thereby determine for each check requiring portion whether checking has been performed or not.

<Function Configuration>

FIG. 10 is a block diagram showing the function configuration of MFP 1 for performing the operation explained in the above-described summary of the operation in MFP 1 according to the second embodiment. Although each function shown in FIG. 10 is also implemented mainly by CPU 11 reading and executing the program stored in memory 12, each function may be implemented by the hardware configuration at least partially shown in FIG. 1.

Referring to FIG. 10, in addition to the configuration shown in FIG. 3, MFP 1 according to the second embodiment further includes an audio input unit 109 for receiving an audio signal input from microphone 15, an audio analysis unit 110 for analyzing the input audio signal, and a check determination unit 111 referring to the viewing history for each check requiring portion set in the document to determine whether checking has been performed or not.

The operation by the user for specifying the viewed portion includes an operation to touch the viewed portion of the document displayed on display device 14 serving as a touch panel and an operation to read the viewed portion to provide an input of the viewed portion through microphone 15.

FIG. 11 is a diagram showing a specific example of the viewing history created based on the former operation. FIG. 12 is a diagram showing a specific example of the viewing history created based on the latter operation.

In the case of the former operation, by way of example, operation input unit 101 receives an input of the operation signal in accordance with the touch operation, and based on this operation signal, specifies the touched position on the display screen in coordinates. Then, as shown in FIG. 11, viewing history recording unit 107 records, as a viewing history, the region represented by the coordinates showing the touched position or the coordinates showing the touched range. In the example in FIG. 11, the touched position is shown in the "touch-panel detection coordinates".

By way of another example, based on the coordinates representing the touched position and the currently displayed page, viewing history recording unit 107 may specify the object corresponding to the touched position in this page, to record the specified object as a viewing history. In this case, viewing history recording unit 107 compares the display position for each object with the touched position. When the display position matches the touched position or when the touched position is included in the display position of the object, it can be determined that the object has been touched. Alternatively, when the distance between the display position of the object and the touched position is equal to or shorter than a prescribed distance, it may be determined that the object has been touched.

In the case of the latter operation, audio input unit 109 receives an input of the audio signal from microphone 15, and audio analysis unit 110 analyzes the audio signal to convert the signal into a character. Then, viewing history recording unit 107 may specify the object on the currently displayed page that is equivalent to the character converted in audio analysis unit 110, and may record the specified object as a viewing history. In the example in FIG. 12, as the information representing the specified object, a character (or a character string) regarded as this object and the position of the character in this page are shown in the "read-out portion".

Also in the second embodiment, viewing history recording unit 107 may store a viewing history associated with each document data, as in the first embodiment. In this way, when the previously displayed document data is displayed, the viewing history generated during the previous display is used to perform the process described below, to thereby allow a shortcut to be displayed.

Check determination unit 111 refers to the check requiring information to specify the check requiring portion set for each page of the displayed document and determines whether or not this check requiring portion is recorded as a viewing history, thereby determining whether the check requiring portion has been checked or not. Check determination unit 111 determines for each check requiring portion set in the document whether checking has been performed or not, and records the checked result as check result information. FIG. 13 is a diagram showing a specific example of the check result information.

By way of example, check determination unit 111 may determine for each check requiring portion that the check requiring portion has been checked when this check requiring portion matches each of the viewing history obtained by the touch operation and the viewing history obtained by an input of the audio signal from microphone 15. Alternatively, when at least one of the viewing history obtained by the touch operation and the viewing history obtained by an input of the audio signal from microphone 15 matches the check requiring portion, check determination unit 111 may determine that this check requiring portion has been checked. It is to be noted that "match" used herein does not need to be a complete match, but may represent a partially overlaid state.

As for the page determined in relevance determination unit 106 as being relevant to the currently displayed page and including the check requiring point determined as being unchecked, shortcut generation unit 108 generates shortcut information for causing a shortcut linked to this page to be displayed on the currently displayed page. Shortcut generation unit 108 then outputs the generated shortcut information to display image generation unit 103.

Preferably, in this case, viewing history recording unit 107 also records the display time as a viewing history for each page of the document displayed on display device 14, as in the first embodiment. Then, shortcut generation unit 108 determines based on the above-described reference time whether each page is checked or unchecked. FIG. 14 is a diagram showing a specific example of the shortcut information in this case. As shown in FIG. 14, in the second embodiment, the shortcut information is generated for displaying a shortcut linked to the page that is relevant to the currently displayed page and also includes an unchecked check requiring point. Furthermore, the shortcut information includes the information indicating whether the page itself has been checked or not (check determination).

<Operation Flow>

Figure 15:
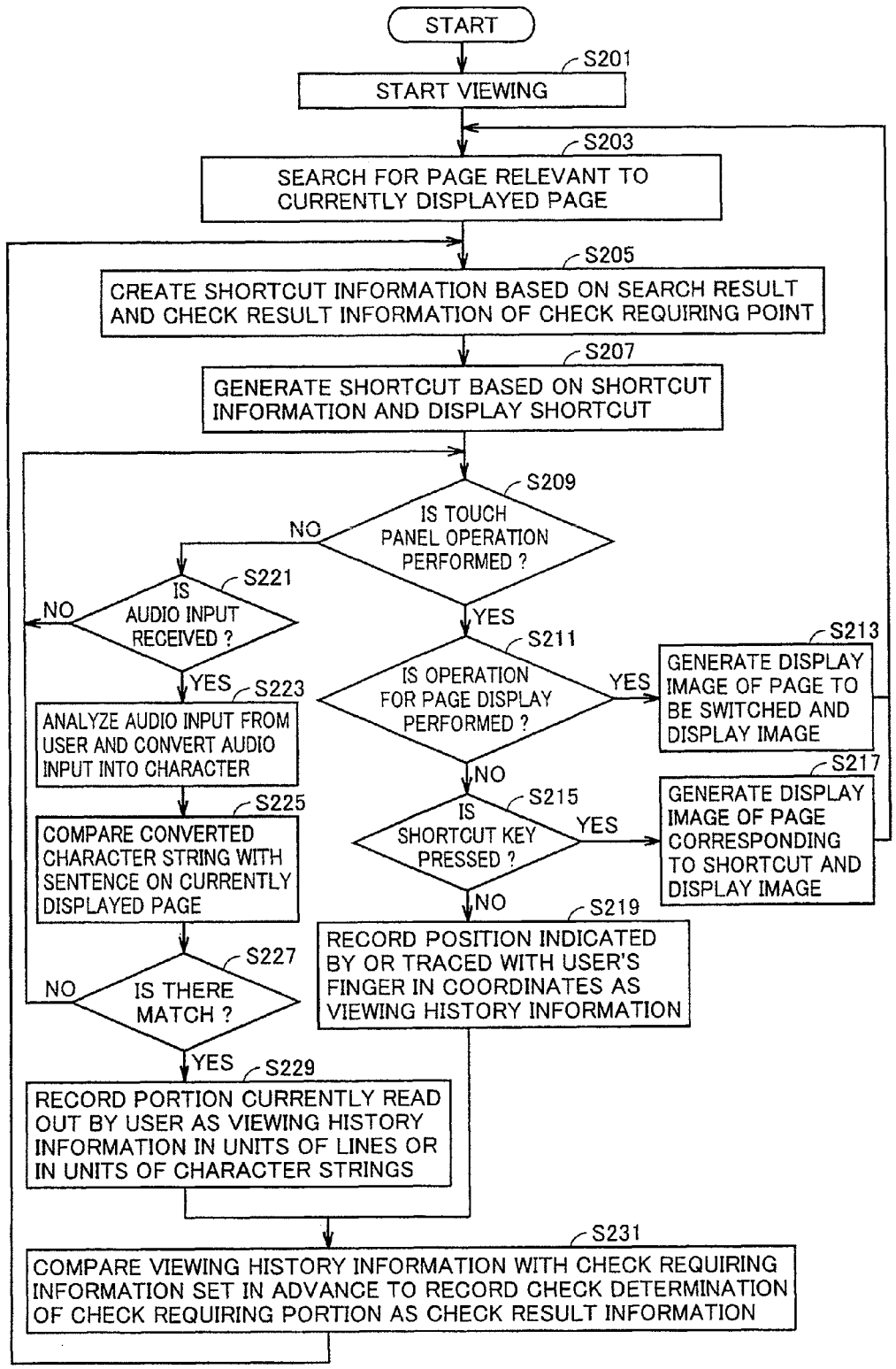
FIG. 15 is a flow chart showing a specific example of the operation in the MFP according to the second embodiment.

FIG. 15 is a flow chart showing a specific example of the operation in MFP 1 according to the second embodiment. The operation shown in the flow chart in FIG. 15 is implemented by CPU 11 reading and executing the program stored in memory 12 and causing each function shown in FIG. 10 to be performed.

Referring to FIG. 15, as in step S101 described above, CPU 11 receives designation of the document and causes display device 14 to start to display the document in step S201. Furthermore, as in step S105 described above, CPU 11 searches for the page relevant to the currently displayed page in step S203.

In display device 14 according to the second embodiment, in step S205, CPU 11 further generates shortcut information linked to the page determined as being relevant in step S203 based on the check result information and including a check requiring point that is unchecked. In step S207, CPU 11 generates an icon image for the shortcut based on the shortcut information, and causes the icon image to be displayed overlaid on the page.

In step S205, the shortcut information may be further generated that is linked to the unchecked page determined as being relevant and including an unchecked check requiring point, and then, the shortcut may be displayed.

Figure 16:
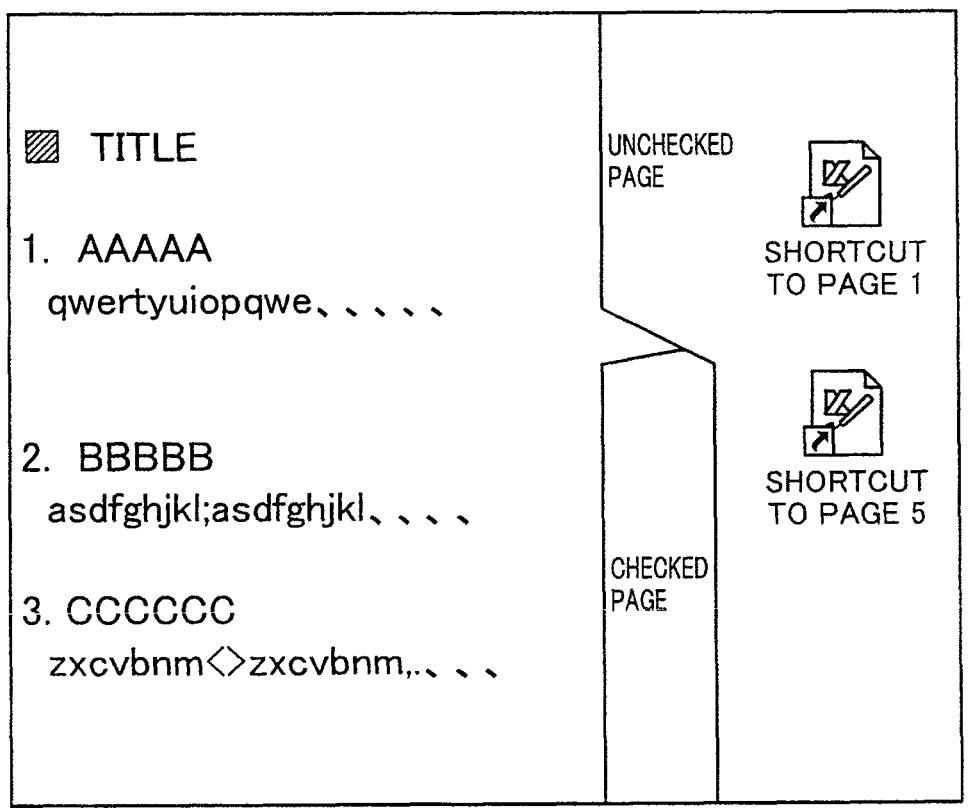
FIG. 16 is a diagram showing a specific example of a screen displayed in step S207 in FIG. 15.

Furthermore, in step S205, the shortcut linked to the page determined as being relevant and including an unchecked check requiring point may be displayed distinctively showing whether the linked page has been checked or not. FIG. 16 is a diagram showing a specific example of the screen displayed in step S207 described above. In the above-described step S207, as shown in FIG. 16, a shortcut is displayed overlaid on the display in step S201 described above. Furthermore, FIG. 14 shows an example in which linked pages are grouped into checked pages and unchecked pages and displayed so as to be selectable by tabs. By way of another example, the display position may be different, the size and color of the shortcut may be different, and the combination thereof may be applied.

In this state, that is, in the state where the shortcut linked to a page relevant to the designated page of the document and including an unchecked check requiring point is displayed overlaid on this designated page of the document, when the operation is performed such that the operation signal indicating the user operation is received from display device 14 serving as a touch panel and this operation is for changing the page to be displayed (YES in step S209 and YES in step S211), CPU 11 generates image data for displaying the designated page on display device 14 and then causes the image data to be displayed, in step S213. Consequently, the display of display device 14 is updated.

Alternatively, in the case where the above-described operation is for pressing the displayed shortcut (YES in step S215), in step S217, CPU 11 refers to the shortcut information to specify the page associated with the shortcut, and switches the displayed page to the linked page to cause the linked page to be displayed. Consequently, the display of display device 14 is updated.

In the case where the above-described operation does not correspond to any operation of display device 14 serving as a touch panel (YES in S209, NO in step S211 and NO in step S215), in step S219, CPU 11 specifies the position specified by the operation signal from display device 14 as a position designated by a user's finger on the displayed page or the position traced with a user's finger thereon, and then, generates and records viewing history information.

On the other hand, in the case where not an operation signal indicating the user operation from display device 14 serving as a touch panel but an audio signal from microphone 15 is received (NO in step S209 and YES in step S221), CPU 11 analyzes the input audio signal and converts the signal into a character in step S223. Then in step S225, CPU 11 compares the character obtained by conversion with the object in the displayed page, to determine whether there is any object matching the character. When there is a matched object (YES in step S227), CPU 11 specifies the matched object as a position read out by the user on the displayed page, and then, generates and records viewing history information, in step S229.

In step S231, CPU 11 makes a comparison with the viewing history information generated for each check requiring portion set in the displayed document, to generate and record check result information indicating the checked result of the check requiring portion.

CPU 11 monitors the input of the operation signal or the audio signal, and continuously performs the processes of step S205 and the subsequent steps in accordance with the input signal.

<Effect of Second Embodiment>

When the above-described operation is performed in MFP 1, each check requiring point is automatically set as being checked/unchecked, for example, by the simple operation such as reading a book, without the user having to set each check requiring point defined in the document as being checked/unchecked. Then, the shortcut linked to the page including an unchecked check requiring point among the pages relevant to the currently displayed page is automatically displayed overlaid on this currently displayed page. Consequently, the user can efficiently view the document without having to perform any particular operation.

Furthermore, the program for causing MFP 1 to execute the above-described display processing can also be provided. The above-described program can be recorded on a non-transitory computer-readable recording medium such as a flexible disk attached to the computer, a CD-ROM (Compact Disk-Read Only Memory), a ROM (Read Only Memory), a RAM (Random Access Memory), and a memory card, and thus, provided as a program product. Alternatively, the program recorded on a non-transitory recording medium such as a hard disk incorporated in a computer can be provided. Furthermore, the program can also be provided by download via a network.

In addition, the program according to the present invention may cause the process to be executed by invoking a required module in a prescribed arrangement at a prescribed timing from program modules provided as part of the operating system (OS) of the computer. In this case, the program itself does not include the above-described modules but cooperates with the OS to execute the process. The program not including the above-described modules may also be included in the program according to the present invention.

Furthermore, the program according to the present invention may be incorporated in a part of another program. Also in such a case, the program itself does not include any modules included in the above-described another program, but cooperates with another program to execute the process. The program included in another program as described above may also be included in the program according to the present invention.

The program product to be provided is installed in a program storage unit such as a hard disk for execution. It is to be noted that a program product includes a program itself and a non-transitory recording medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A document viewing device for displaying document data divided for each page, said document viewing device comprising:
   a storage device for storing said document data;
   a display device;
   a processing device for performing a process of causing said display device to display a document based on said document data; and
   an input device for accepting a user operation,
   said processing device performing
   a process of generating a viewing history of said document by a user based on said user operation performed for said document displayed on said display device,
   a process of evaluating relevance to an object displayed on said display device and searching for a page relevant to the object displayed on said display device from pages of said document data,
   a process of determining based on said viewing history whether the relevant page searched is checked or unchecked,
   a process of generating a shortcut linked to the relevant page searched and determined to be unchecked, and
   a process of displaying the shortcut together with the displayed object on the display device.

2. The document viewing device according to claim 1, wherein, based on said user operation to select said shortcut, said processing device further updates display of said display device to said page to which said shortcut is linked.

3. The document viewing device according to claim 1, wherein, in said process of searching for a relevant page, said processing device searches for, as said relevant page, a page of the document other than the page displayed on said display device, said page of the document including the object identical to the object included in the page displayed on said display device.

4. The document viewing device according to claim 1, wherein, in said process of searching for the relevant page, said processing device searches for, as said relevant page, a page of the document other than the page displayed on said display device, said page of the document being linked to the page displayed on said display device.

5. The document viewing device according to claim 1, wherein
   in said process of generating the viewing history, said processing device records display time as said viewing history for each page displayed on said display device, and
   in said process of determining whether the relevant page searched is checked or unchecked, said processing device compares said display time with reference time stored in advance for each page of said document, to determine for each said page whether the object is checked or unchecked by said user.

6. The document viewing device according to claim 1, wherein
   said input device receives designation specifying a position of the document displayed on said display device, and
   in said process of generating the viewing history, said processing device records, as said viewing history, information specifying the position on the page displayed on said display device, said position being designated in said input device.

7. The document viewing device according to claim 6, wherein
   said document data includes information specifying a prescribed object of said document data,
   in the process of determining whether the relevant page searched is checked or unchecked, the processing device determines whether the object included in the relevant page searched is checked or unchecked, and extracts the relevant page searched whose object is determined to be unchecked, and
   in said process of extracting the page for which it is determined that the object is unchecked, said processing device determines based on said viewing history based on the designation specifying the position of said document received by said input device whether each said prescribed object is checked or unchecked by said user.

8. The document viewing device according to claim 7, wherein
in said process of extracting the page for which it is determined that the object is unchecked, said processing device extracts the page including said prescribed object determined as being unchecked from pages each searched for as being relevant to the object displayed on said display device, and
in the process of generating the shortcut, the processing device generates the shortcut linked to the extracted page whose object is determined to be unchecked.

9. The document viewing device according to claim 7, wherein
in said process of generating the viewing history, said processing device records display time as said viewing history for each page displayed on said display device, and
in said process of extracting the page for which it is determined that the object is unchecked, said processing device compares said display time with reference time stored in advance for each page of said document, to determine for each said page whether the object is checked or unchecked by said user, and extract the page that includes said prescribed object determined as being unchecked and is determined as being unchecked by said user from pages each searched for as being relevant to the object displayed on said display device.

10. The document viewing device according to claim 7, wherein
in said process of generating the viewing history, said processing device records display time as said viewing history for each page displayed on said display device, and
in said process of extracting the page for which it is determined that the object is unchecked, said processing device compares said display time with reference time stored in advance for each page of said document, to determine for each said page whether the object is checked or unchecked by said user, and extract the page including said prescribed object determined as being unchecked from pages each searched for as being relevant to the object displayed on said display device.

11. The document viewing device according to claim 1, wherein
said input device receives an audio input, and
said processing device records, as said viewing history, information specifying the object that corresponds to the input audio and is included in the page displayed on said display device when said audio input is received.

12. The document viewing device according to claim 11, wherein
said document data includes information specifying a prescribed object of said document data,
in the process of determining whether the relevant page searched is checked or unchecked, the processing device determines whether the object included in the relevant page searched is checked or unchecked, and extracts the relevant page searched whose object is determined to be unchecked, and
in said process of extracting the page for which it is determined that the object is unchecked, said processing device determines based on said viewing history based on said audio input received by said input device whether each said prescribed object is checked or unchecked by said user.

13. The document viewing device according to claim 12, wherein
in said process of extracting the page for which it is determined that the object is unchecked, said processing device extracts the page including said prescribed object determined as being unchecked from pages each searched for as being relevant to the object displayed on said display device, and
in the process of generating the shortcut, the processing device generates the shortcut linked to the extracted page whose object is determined to be unchecked.

14. The document viewing device according to claim 12, wherein
in said process of generating the viewing history, said processing device records display time as said viewing history for each page displayed on said display device, and
in said process of extracting the page for which it is determined that the object is unchecked, said processing device compares said display time with reference time stored in advance for each page of said document, to determine for each said page whether the object is checked or unchecked by said user, and extract the page that includes said prescribed object determined as being unchecked and is determined as being unchecked by said user from pages each searched for as being relevant to the object displayed on said display device.

15. The document viewing device according to claim 12, wherein
in said process of generating the viewing history, said processing device records display time as said viewing history for each page displayed on said display device,
in said process of extracting the page for which it is determined that the object is unchecked, said processing device compares said display time with reference time stored in advance for each page of said document, to determine for each said page whether the object is checked or unchecked by said user, and extract the page including said prescribed object determined as being unchecked from pages each searched as being relevant to the object displayed on said display device, and
in said process of displaying the shortcut, said processing device causes said display device to display said shortcut distinctively based on a determination result as to whether the object is checked or unchecked by said user.

16. A method of displaying document data divided for each page in a document viewing device,
said document viewing device including an input device for accepting a user operation, said method comprising the steps of:
generating a viewing history of a document by a user based on said user operation performed for a page displayed on a display device;
evaluating relevance to an object displayed on said display device and searching for a page relevant to the object displayed on said display device from pages of said document data;
determining based on said viewing history whether the relevant page searched is checked or unchecked;
generating a shortcut linked to the relevant page searched and determined to be unchecked; and
displaying the shortcut together with the displayed object on the display device.

17. The method according to claim 16, wherein
said step of generating the viewing history includes the step of recording display time as said viewing history for each page displayed on said display device, and the step of determining whether the relevant page searched is checked or unchecked includes the step of comparing said display time with reference time stored in advance for each page of said document, to determine for each said page whether the object is checked or unchecked by said user.

18. The method according to claim 16, wherein
said document data includes information specifying a prescribed object of said document data,
said step of generating the viewing history includes the step of recording, as said viewing history, information specifying a position of said document data designated by said user operation based on said user operation performed for the page displayed on said display device,
the step of determining whether the relevant page searched is checked or unchecked includes the step of determining whether the object included in the relevant page searched is checked or unchecked, and extracting the relevant page searched whose object is determined to be unchecked, and
said step of extracting the page for which it is determined that the object is unchecked includes the step of determining based on said viewing history whether each said prescribed object is checked or unchecked by said user, to extract the page including said prescribed object determined as being unchecked from pages each searched for as being relevant to the object displayed on said display device.

19. A non-transitory computer-readable recording medium recording a program for causing a document viewing device to perform a process of displaying document data divided for each page,
said document viewing device including an input device for accepting a user operation,
said program causing said document viewing device to perform the steps of:
generating a viewing history of a document by a user based on said user operation performed for a page displayed on a display device;
evaluating relevance to an object displayed on said display device and searching for a page relevant to the object displayed on said display device from pages of said document data;
determining based on said viewing history whether the relevant page searched is checked or unchecked;
generating a shortcut linked to the relevant page searched and determined to be unchecked; and
displaying the shortcut together with the displayed object on the display device.

20. The non-transitory computer-readable recording medium according to claim 19, wherein
said step of generating the viewing history includes the step of recording display time as said viewing history for each page displayed on said display device, and
the step of determining whether the relevant page searched is checked or unchecked includes the step of comparing said display time with reference time stored in advance for each page of said document to determine for each said page whether the object is checked or unchecked by said user.

21. The non-transitory computer-readable recording medium according to claim 19, wherein
said document data includes information specifying a prescribed object of said document data,
said step of generating the viewing history includes the step of recording information specifying a position of said document data designated by said user operation as said viewing history based on said user operation performed for the page displayed on said display device,
the step of determining whether the relevant page searched is checked or unchecked includes the step of determining whether the object included in the relevant page searched is checked or unchecked, and extracting the relevant page searched whose object is determined to be unchecked, and
said step of extracting the page for which it is determined that the object is unchecked includes the step of determining based on said viewing history whether each said prescribed object is checked or unchecked by said user, to extract a page including said prescribed object determined as being unchecked from pages each searched for as being relevant to the object displayed on said display device.

* * * * *